United States Patent
Uota

[11] Patent Number: 5,500,471
[45] Date of Patent: Mar. 19, 1996

[54] POLYARYLENE SULFIDE RESIN COMPOSITION

[75] Inventor: Katsumi Uota, Shizuoka, Japan

[73] Assignee: Polyplastics Co., Ltd., Osaka, Japan

[21] Appl. No.: 412,085

[22] Filed: Mar. 27, 1995

Related U.S. Application Data

[63] Continuation of Ser. No. 19,289, Feb. 18, 1993, abandoned.

[30] Foreign Application Priority Data

Feb. 19, 1992 [JP] Japan ............... 4-32015

[51] Int. Cl.⁶ ............... C08K 5/24
[52] U.S. Cl. ............... 524/262; 524/264; 524/265; 524/496; 524/539; 524/540; 524/609
[58] Field of Search ............... 524/262, 264, 524/265, 496, 540, 609, 539

[56] References Cited

U.S. PATENT DOCUMENTS

| | | | |
|---|---|---|---|
| 4,529,769 | 7/1985 | Johnson et al. | 524/414 |
| 4,889,893 | 12/1989 | Koaashi et al. | 525/500 |
| 4,917,957 | 4/1990 | Nitoh et al. | 428/447 |
| 4,935,473 | 6/1990 | Fukuda et al. | 524/609 |
| 4,971,726 | 11/1990 | Maeno et al. | 524/496 |
| 4,985,175 | 1/1991 | Dxiurla et al. | 252/506 |
| 5,149,731 | 9/1992 | Uota et al. | 524/265 |
| 5,252,679 | 10/1993 | Serizawa et al. | 525/420 |

FOREIGN PATENT DOCUMENTS 3917516  6/1990  Germany.

OTHER PUBLICATIONS

Derwent Publications Ltd., 89-343313, JP-A-1 str, 766, Shinetsu Polymer Co. Abstract.

*Primary Examiner*—Mark D. Sweet
*Attorney, Agent, or Firm*—Depaoli & Frenkel

[57] ABSTRACT

The present invention provides a polyarylene sulfide resin composition having excellent general properties and particularly excellent conductivity and antistatic properties which comprises:

(A) 100 parts by weight of a polyarylene sulfide resin,
(B) 3 to 50 parts by weight of expandable graphite having an average particle diameter of 5 to 800 μm,
(C) 0.01 to 5 parts by weight of an alkoxysilane compound, and
(D) 0 to 300 parts by weight of a filler other than the component (B) which is selected from among fibrous, powdery and platy fillers.

19 Claims, No Drawings

POLYARYLENE SULFIDE RESIN COMPOSITION

This application is a continuation of application Ser. No. 08/019,289, filed Feb. 18, 1993, now abandoned.

FIELD OF THE INVENTION

The present invention relates to a polyarylene sulfide resin composition having good general properties, and in particular, to a polyarylene sulfide resin composition having excellent conductivity and antistatic properties.

DESCRIPTION OF THE RELATED ART

Recently, thermoplastic resins having excellent thermal resistance, mechanical properties and chemical resistance and, in addition, a high flame retardancy have come to be required as the materials of construction for parts of electric and electronic appliances, automobile appliances and chemical instruments. Polyarylene sulfide (PAS) resins typified by polyphenylene sulfide (PPS) belong to the resins satisfying these requirements. The demand for improving the properties of such resins is increasing. Improvement is usually achieved by the incorporation of a fibrous reinforcing material such as glass fibers or another inorganic filler into the resin.

As the uses of these resins are enlarged, further improved properties or special properties are often required of them. These properties include conductivity and antistatic behavior. The importance of conductivity and antistatic properties is increasing in order to prevent dust from adhering to the resinous parts of electric or electronic appliances by static electricity and also to prevent troubles difficulties by electromagnetic waves.

Conductivity and antistatic properties are usually imparted to thermoplastic resins by incorporating an organic antistatic agent into the resins or applying the antistatic agent to the surfaces of the molded articles. Additionally a metallic or carbon filler is dispersed in the resins to impart conductive and antistatic behavior. However, the use of an antistatic agent is practically insufficient, because of the following defects. An antistatic agent is apt to be deteriorated during melt kneading when incorporated into PAS resin since the PAS resin has a high melting point. When the antistatic agent is applied to the surfaces of molded articles, problems of adhesion and an influence of humidity are also posed. In both cases, changes in the antistatic properties with time are considerable and the dispersion in the resistance value is large. On the other hand, metallic filler is expensive and has a high specific gravity which makes weight reduction impossible. Another problem with metallic filler is that the filler has such a high hardness that it seriously abrades the barrel, screw, mold, etc., of an extruder or molding machine during processing. On the contrary, above-described problems are not so serious in the case of the incorporating a carbon conductive substance such as conductive carbon black, carbon fibers or graphite, to impart conductivity to thermoplastic resins. In particular, it is believed that graphite is effective in improving both conductivity and abrasion properties. However, when graphite is added to PAS resin, the effect of improving the conductivity and antistatic properties thereof cannot always be obtained and, in particular, a bad influence is exerted on the general properties such as moldability, mechanical properties and thermal stability. Accordingly, the improvements in conductivity and antistatic properties upon the addition of graphite to PAS resin is insufficient when balanced with the decrease in general properties, and, thus, a further improvement is needed.

SUMMARY OF THE INVENTION

The inventors have found that although incorporation of a specified graphite into PAS resin is particularly effective in obtaining a stable conductivity (resistance value), graphite has a marked tendency to impair the general properties, particularly mechanical properties such as toughness. Accordingly a PAS resin material having well-balanced properties including improved conductivity and antistatic properties and excellent general properties, particularly mechanical properties, is achieved by adding other components in addition to graphite.

Thus the present invention provides a polyarylene sulfide resin composition having improved conductivity and antistatic properties which comprises:
(A) 100 parts by weight of a polyarylene sulfide resin,
(B) 3 to 50 parts by weight of expandable graphite having an average particle diameter of 5 to 800 μm,
(C) 0.01 to 5 parts by weight of an alkoxysilane compound, and
(D) 0 to 300 parts by weight of a filler other than the component (B) which is selected from among fibrous, powdery and platy fillers, and optionally,
(E) 0.5 to 30 parts by weight of a specified polyolefinic copolymer.

DETAILED DESCRIPTION OF THE INVENTION

Now description will be made on the components constituting the composition of the present invention.

The base resin in the present invention is a PAS resin (A) which is a polymer comprising at least 70 molar % of repeating units represented by the structural formula: —Ar—S— (Ar being an arylene group). A typical PAS resin (A) is a polyphenylene sulfide comprising at least 70 molar % of repeating units represented by the structural formula: —Ph—S— (Ph being a phenylene group). Particularly suitable is a polyphenylene sulfide having a melt viscosity, determined under tile conditions comprising a temperature of 310° C. and a shear rate of 1200/sec, in the range of 10 to 20000 P, particularly 100 to 5000 P.

In general, known PAS resins are categorized into those having substantially linear molecular structure and being free from branched or crosslinked structure and those having branched or crosslinked structures according to the production process therefor, and the present invention is effective for the PAS resins of both types.

The PAS resins preferably usable in the present invention are homopolymers or copolymers comprising at least 70 molar %, more desirably at least 80 molar %, of p-phenylene sulfide units as the repeating unit. When the p-phenylene sulfide content is below 70 molar %, the inherent crystallinity of the resin is reduced and the sufficient mechanical properties which are the characteristics of crystalline polymers tend to be difficultly obtained. The copolymer is constituted of units including, for example, m-phenylene sulfide, o-phenylene sulfide, p,p'-diphenylene ketone sulfide, p,p'-diphenylene sulfone sulfide, p,p'-biphenylene sulfide, p,p'-diphenylene ether sulfide and 2,6-naphthalene sulfide units.

The PAS resins more preferably usable in the present invention are substantially linear PPS homopolymers comprising p-phenylene sulfide as the repeating unit, and PPS copolymers mainly comprising p-phenylene sulfide as the repeating unit and at most 20 molar % of m-phenylene sulfide.

A branched or crosslinked polyarylene sulfide resin produced by polymerizing a mixture containing a small amount of a monomer having three or more functional groups as a part of the monomers is also usable as the polyarylene sulfide resin of the present invention in addition to the above-described substantially linear polymers. A compounded resin produced by blending the above-described linear polymer with such a branched or crosslinked polyarylene sulfide resin is also suitably usable.

The PAS resin to be used as the component (A) in the present invention may be a polymer produced by crosslinking a linear polymer of a relatively low molecular weight by oxidation or by heat to increase the melt viscosity and thereby improve the moldability thereof.

The expandable graphite (B) to be used in the present invention is one produced by treating natural, artificial, or other graphite with a strong acid such as sulfuric or nitric acid, a strong oxidizing agent, a halogen compound or tile like to form an intercalation substance between the crystal lattices of the graphite, washing the resultant product with water, dehydrating, rapidly heating (800° to 1200° C.) to expand the resultant product several to several hundred times as much by volume, and pulverizing the expanded product to have an average particle diameter of 5 to 800 μm. It has been found that as compared with ordinary natural or artificial graphites, the expandable graphite exhibits an extremely remarkable conductivity improving effect on PAS and that with only a very small amount of the expandable graphite, a low surface resistivity can be imparted to PAS. It has been found, however, that the incorporation of the graphite exerts a significant bad effect on the properties, particularly mechanical properties such as toughness, of the PAS resin. The present invention is therefore, characterized also by the components described below which are incorporated into the PAS resin in order to overcome this defect. When the amount of the expandable graphite used exceeds 50 parts by weight (for 100 parts by weight of PAS), the mechanical properties of the PAS resin cannot be maintained even by using the component (C) or the like and, on the other hand, when the expandable graphite is present in amounts below 3 parts by weight, the effect of improving the conductivity is unfavorably insufficient.

Further an alkoxysilane compound (C) is incorporated into the composition of the present invention. The alkoxysilane compounds (C) usable herein are epoxyalkoxysilanes, aminoalkoxysilanes, vinylalkoxysilanes and mercaptoalkoxysilanes, which can be used either singly or in combination of two or more.

The epoxyalkoxysilanes include, for example, γ-glycidoxypropyltrimethoxysilane, β-(3,4-epoxycyclohexyl)ethyltrimethoxysilane and γ-glycidoxypropyltriethoxysilane, The aminoalkoxysilanes include, for example, γ-aminopropyltrimethoxysilane, γ-aminopropyltriethoxysilane, γ-aminopropylmethyldimethoxysilane, γ-aminopropylmethyldiethoxysilane, N-(β-aminoethyl)-γ-aminopropyltrimethoxysilane, N-phenyl-γ-aminopropyltrimethoxysilane, γ-diallylaminopropyltrimethoxysilane and γ-diallylaminopropyltriethoxysilane, The vinylalkoxysilanes include, for example, vinyltriethoxysilane, vinyltrimethoxysilane and vinyltris(β-methoxyethoxy)silane, and The mercaptoalkoxysilanes include, for example, γ-mercaptopropyltrimethoxysilane and γ-mereaptopropyltriethoxysilane.

The amount of the alkoxysilane compound used as the component (C) is 0.01 to 5 parts by weight, preferably 0.1 to 3 parts by weight, per 100 parts by weight of the polyarylene sulfide resin. Although the reaction mechanism of the component (C) has not yet been fully elucidated, the component (C) inhibits the deterioration of the mechanical properties of PAS caused by the incorporation of the expandable graphite, does not inhibit the conductivity effect of the expandable graphite at all but rather improves this effect, thus being effective in both reducing the dispersion of the surface resistivity and improving the toughness of the resin.

Although a filler other than the expandable graphite used as the component (D) is not always needed, it is preferred to incorporate a filler in order to obtain molded articles having excellent mechanical strength, rigidity, thermal resistance and dimensional stability. A fibrous, powdery or platy filler is used depending on the purpose.

The fibrous fillers include inorganic fibrous substances such as fibers of glass asbestos, carbon, silica, silica/alumina, zirconia, boron nitride, silicon nitride, boron and potassium titanate. Particularly typical fibrous filler is glass fibers. High-melting organic fibrous substances such as polyamides, fluororesins and acrylic resins are also usable.

The powdery filers include silicates such as silica, quartz powder, glass beads, glass powder, calcium silicate, aluminum silicate, kaolin, talc, clay, diatomaceous earth and wollastonite; metal oxides such as iron oxide, titanium oxide and alumina; metal carbonates such as calcium carbonate and magnesium carbonate; metal sulfates such as calcium sulfate and barium sulfate; and, in addition, silicon carbide, silicon nitride, boron nitride and metal powders.

The platy fillers include mica and glass flakes.

These inorganic fillers can be used either singly or in combination of two or more. A combination of a fibrous filler, particularly glass fiber, with a powdery or platy filler is preferred for obtaining both mechanical strength and dimensional accuracy.

The amount of the filler is at most 300 parts by weight, desirably at most 200 parts by weight, per 100 parts by weight of the PAS resin. When the amount of filler is in excess, the moldability of the resin is unfavorably impaired.

It is preferred to incorporate a specified olefinic copolymer (E) into the antistatic polyarylene sulfide resin composition of the present invention for further improving the toughness thereof, though the copolymer (E) is not an indispensable component.

The olefinic copolymers (E) to be used herein are the following copolymers or graft copolymers mainly comprising an α-olefin:

(a) copolymers of ethylene with an α-olefin having 3 or more carbon atoms (such as propylene, butene-1. hexane-1, 4-methylbutene-1 or 4-methylpentene-1; particularly propylene or butene-1), (b) copolymers of an α-olefin (such as ethylene, propylene or butene-1) with an α,β-unsaturated carboxylic acid or ester thereof (such as acrylic acid, methacrylic acid, ethacrylic acid, maleic acid, fumaric acid or an alkyl ester, glycidyl ester or anhydride thereof), (c-1) graft copolymers comprising the copolymer(a) grafted with an α,β-unsaturated carboxylic acid or a derivative thereof (such as acrylic acid, methacrylic acid, ethacrylic acid, maleic acid, fumaric acid or an alkyl ester, glycidyl ester, anhydride or imide thereof), and (c-2) graft copolymers having a structure formed by chemically bonding the copolymer (b) to a polymer or copolymer comprising at least one of vinyl compounds such as styrene or acrylonitrile, α,β-unsaturated carboxylic acids and derivatives thereof.

These olefinic copolymers or graft copolymers (a) to (c) may be used either singly or in the form of a mixture of two or more of them, or they may be used in the form of a polymer having a multiphase structure produced by stepwise (co)polymerization or graft polymerization. Particularly preferred substances include graft copolymers produced by grafting an ethylene/propylene or ethylene/butene-1 copolymer with maleic anhydride or maleimide; ethylene/alkyl acrylate copolymers and graft copolymers produced by grafting these copolymers with maleic anhydride; copolymers of an α-olefin, particularly ethylene, with glycidyl acrylate or glycidyl methacrylate, and graft copolymers comprising this copolymer chemically bonded to at least one polymerizable or copolymerizable segment such as styene, acrylonitrile, alkyl acrylate or alkyl methacrylate.

The PAS resin composition of the present invention may further contain supplementarily a small amount of thermoplastic resins other than those described above, such as vinyl resins, e.g., polyvinyl chloride resin, polyvinylidene chloride resin and polystyrene, polycarbonate resins, polyamide resins, polyimide resins, other polyolefinic resins, polyester resins, polyether resins, polysulfone resins, epoxy resins, natural rubbers and synthetic rubbers without departing from the object of the invention. Further, additives such as flame retardant, stabilizers e.g. antioxidant and ultraviolet screening agent, lubricant, releasing agent, nucleating agent, foaming agent, crosslinking agent and colorant, can be used if necessary.

The composition of the present invention can be prepared by various well-known methods such as a method wherein the necessary components are fed at once to a mixer such as a Henschel mixer and homogeneously mixed, and the resultant mixture is melt-kneaded and pelletized on an extruder.

If necessary, a specified component may be premixed with other components to form a master batch, which is then mixed with the other components to finally homogeneously disperse them, thereby obtaining an intended composition.

EXAMPLES

The following Examples will further illustrate the present invention, and are by no means intended to limit the invention.

The substances (A), (B), (C), (D) and (E) used in the following Examples and Comparative Examples were as follows:
(A) polyphenylene sulfide resin (PPS):
Fortron KPS; a product of Kureha Chemical Industry Co., Ltd.,
(B) Graphites:
B-1: expandable graphite,
B'-1: natural scaly graphite,
B'-2: natural earthy graphite,
B'-3: artificial graphite,
B'-4: conductive carbon black, and
B'-5: carbon fiber.
(C) Alkoxysilane compounds:
C-1: aminopropyltriethoxysilane,
C-2: glycidoxypropyltrimethoxysilane,
C-3: mercaptopropyltrimethoxysilane.
(D) Glass fibers (average diameter: 13 μm) and calcium carbonate,
(E) Olefinic copolymers:
 E-1: ethylene/glycidyl methacrylate (weight ratio: 85/15) copolymer,
 E-2: graft copolymer prepared by grafting E-1 with styrene/acrylonitrile copolymer (weight ratio of E-1 to copolymer: 70:30),
 E-3: graft copolymer prepared by grafting E-1 with polymethyl methacrylate (weight ratio: 70:30),
 E-4: graft copolymer prepared by grafting ethylene/ethyl acrylate (weight ratio: 75/25) copolymer with maleic anhydride (weight ratio: 97:3).

The methods for the determination of the properties in the Examples and Comparative Examples were as described below.

Surface Resistivity and Variation thereof

The surface resistivity was determined according to ASTM D-257 and the average of the five samples, and the range from the minimum to the maximum as the variation were given.

Tensile Test

The tensile strength and tensile elongation were determined according to ASTM D-638.

Izod Impact Strength

The Izod impact values on the notched side and unnotched side were determined according to ASTM D-256.

Example 1 and Comparative Examples 1 to 8

The components (A), (B) and (C) listed in Table 1 were mixed together on a Henschel mixer for 5 min and the resultant mixture was melt-kneaded on a double-screw extruder at a cylinder temperature of 310° C. to form pellets. Then the ASTM test pieces were prepared on an injection molding machine at a cylinder temperature of 320° C. and a mold temperature of 150° C. to determine the above-described properties of the test pieces. For comparison, the properties were determined as described above except that the composition lacking in any of the indispensable components of the present invention was used and the expandable graphite was replaced by other graphite or other carbonaceous substance. The results are given in Table 1.

Examples 1 to 5 and Comparative Examples 9 to 11

The same test as that of Example 1 was repeated except that the average particle diameter and amount of the expanded graphite were altered. The results are given in Table 2.

Examples 1 and 6 to 10 and Comparative Examples 2 and 12

The same test as that of Example 1 was repeated except that the amount and variety of the alkoxysilane were altered. The results are given in Table 3.

Example 11 and Comparative Examples 13 to 19

The same test as that described above was repeated except that glass fiber, calcium carbonate and an olefinic copolymer were further incorporated in addition to the components listed in Table 1. The results are given in Table 4.

Examples 11 to 17

The same test as that of Example 11 was repeated except that the amount and variety of the olefinic copolymer (E) were altered. The results are given in Table 5.

TABLE 1

|  |  | Ex. 1 | Comp. Ex. 1 | 2 | 3 | 4 | 5 | 6 | 7 | 8 |
|---|---|---|---|---|---|---|---|---|---|---|
| Compn. | (a) PPS (pt. by wt.) | (100) | " | " | " | " | " | " | " | " |
|  | (B) variety of graphite | B-1 | — | B-1 | — | B'-1 | B'-2 | B'-3 | B'-4 | B'-5 |
|  | [av. particle diam. (μm)] | [200] |  | [200] |  | [100] | [3] | [6] |  |  |
|  | (pt. by wt.) | (10) |  | (10) |  | (10) | (10) | (10) | (10) | (10) |
|  | (C) variety of alkoxysilane | C-1 | — | — | C-1 | " | " | " | " | " |
|  | (pt. by wt.) | (2) |  |  | (2) |  |  |  |  |  |
| Properties | av. surface resistivity (Ω) | $7 \times 10^5$ | $8 \times 10^{16}$ | $2 \times 10^6$ | $7 \times 10^{16}$ | $5 \times 10^{14}$ | $3 \times 10^{15}$ | $6 \times 10^{14}$ | $3 \times 10^3$ | $7 \times 10^{12}$ |
|  | (variation) | (5~9) | (1~12) | (0.3~10) | (3~9) | (3~6) | (0.7~7) | (5~8) | (0.1~14) | (1~13) |
|  | tensile strength (kg/cm²) | 515 | 798 | 480 | 780 | 520 | 507 | 513 | 463 | 1320 |
|  | tensile elongation (%) | 1.7 | 3.4 | 1.3 | 3.5 | 1.6 | 1.7 | 1.7 | 1.0 | 2.0 |
|  | Izod impact strength notched side (kg · cm/cm) | 1.2 | 1.5 | 1.0 | 1.6 | 1.2 | 1.2 | 1.3 | 0.9 | 3.1 |
|  | unnotched side (kg · cm/cm) | 25.0 | 35.1 | 17.2 | 33.5 | 23.2 | 21.8 | 22.4 | 15.1 | 36.0 |

TABLE 2

|  |  | Ex. 1 | 2 | 3 | 4 | 5 | Comp. Ex. 9 | 10 | 11 |
|---|---|---|---|---|---|---|---|---|---|
| Compn. | (a) PPS (pt. by wt.) | (100) | " | " | " | " | " | " | " |
|  | (B) variety of graphite | B-1 | B-1 | B-1 | B-1 | B-1 | B-1 | B-1 | B-1 |
|  | [av. particle diam. (μm)] | [200] | [10] | [50] | [700] | [200] | [1000] | [200] | [200] |
|  | (pt. by wt.) | (10) | (10) | (10) | (10) | (30) | (10) | (1) | (70) |
|  | (C) variety of alkoxysilane | C-1 | " | " | " | " | " | " | " |
|  | (pt. by wt.) | (2) |  |  |  | (2) |  |  |  |
| Properties | av. surface resistivity (Ω) | $7 \times 10^5$ | $9 \times 10^6$ | $8 \times 10^5$ | $3 \times 10^6$ | $1 \times 10^5$ | $4 \times 10^7$ | $4 \times 10^{16}$ | $2 \times 10^4$ |
|  | (variation) | (5~9) | (0.3~50) | (6~10) | (1~6) | (0.8~2) | (0.2~40) | (2~8) | (1~3) |
|  | tensile strength (kg/cm²) | 515 | 508 | 521 | 518 | 446 | 481 | 712 | 308 |
|  | tensile elongation (%) | 1.7 | 1.7 | 1.8 | 1.6 | 1.2 | 1.2 | 3.2 | 0.4 |
|  | Izod impact strength notched side (kg · cm/cm) | 1.2 | 1.1 | 1.2 | 1.1 | 1.1 | 1.0 | 1.4 | 0.7 |
|  | unnotched side (kg · cm/cm) | 25.0 | 24.7 | 26.3 | 20.7 | 15.7 | 15.0 | 28.3 | 8.5 |

TABLE 3

|  |  | Ex. 1 | 6 | 7 | 8 | 9 | 10 | Comp. Ex. 2 | 12 |
|---|---|---|---|---|---|---|---|---|---|
| Compn. | (a) PPS (pt. by wt.) | (100) | " | " | " | " | " | " | " |
|  | (B) variety of graphite | B-1 | " | " | " | " | " | " | " |
|  | [av. particle diam. (μm)] | [200] |  |  |  |  |  |  |  |
|  | (pt. by wt.) | (10) |  |  |  |  |  |  |  |
|  | (C) variety of alkoxysilane | C-1 | C-1 | C-1 | C-1 | C-2 | C-3 | — | C-1 |
|  | (pt. by wt.) | (2) | (0.2) | (1) | (5) | (2) | (2) |  | (8) |
| Properties | av. surface resistivity (Ω) | $7 \times 10^5$ | $1 \times 10^6$ | $6 \times 10^5$ | $9 \times 10^5$ | $9 \times 10^5$ | $1 \times 10^6$ | $2 \times 10^6$ | not determined (abnormal viscosity, poor moldability) |
|  | (variation) | (5~9) | (0.7~2) | (4~8) | (6~10) | (7~12) | (0.8~2) | (0.3~10) |  |
|  | tensile strength (kg/cm²) | 515 | 502 | 517 | 520 | 523 | 511 | 480 |  |
|  | tensile elongation (%) | 1.7 | 1.6 | 1.9 | 1.8 | 1.8 | 1.6 | 1.3 |  |
|  | Izod impact notched side (kg · cm/cm) | 1.2 | 1.2 | 1.3 | 1.2 | 1.1 | 1.3 | 1.0 |  |

TABLE 3-continued

|  |  | Ex. | | | | | | Comp. Ex. | |
|---|---|---|---|---|---|---|---|---|---|
|  |  | 1 | 6 | 7 | 8 | 9 | 10 | 2 | 12 |
| strength | unnotched side (kg·cm/cm) | 25.0 | 22.6 | 24.3 | 26.5 | 22.4 | 21.8 | 17.2 |  |

TABLE 4

|  |  | Ex. | Comp. Ex. | | | | | | |
|---|---|---|---|---|---|---|---|---|---|
|  |  | 11 | 13 | 14 | 15 | 16 | 17 | 18 | 19 |
| Compn. | (a) PPS (pt. by wt.) | (100) | " | " | " | " | " | " | " |
|  | (B) variety of graphite | B-1 | — | B-1 | — | B'-1 | B'-2 | B'-3 | B'-4 |
|  | [av. particle diam. (μm)] | [200] |  | [200] |  | [100] | [3] | [6] | [10] |
|  | (pt. by wt.) | (10) |  | (10) |  | (10) | (10) | (10) | (10) |
|  | (C) variety of alkoxysilane | C-1 | — | — | C-1 | " | " | " | " |
|  | (pt. by wt.) | (2) |  |  | (2) |  |  |  |  |
|  | (D) glass fiber (pt. by wt.) | (35) | " | " | " | " | " | " | " |
|  | calcium carbonate (pt. by wt.) | (35) | " | " | " | " | " | " | " |
|  | (E) variety of olefinic copolymer (pt. by wt.) | E-2 (10) | " | " | " | " | " | " | " |
| Properties | av. surface resistivity (Ω) | $3 \times 10^5$ | $1 \times 10^{16}$ | $6 \times 10^5$ | $2 \times 10^{16}$ | $2 \times 10^{14}$ | $8 \times 10^{14}$ | $4 \times 10^{14}$ | $3 \times 10^2$ |
|  | (variation) | (1~4) | (0.8~6) | (1~11) | (0.8~4) | (0.8~7) | (6~12) | (1~7) | (0.7~9) |
|  | tensile strength (kg/cm²) | 1103 | 1230 | 1097 | 1210 | 1121 | 1085 | 1113 | 993 |
|  | tensile elongation (%) | 1.8 | 2.1 | 1.6 | 2.3 | 1.7 | 1.8 | 1.7 | 1.5 |
|  | Izod notched side impact (kg·cm/cm) | 5.1 | 6.1 | 4.8 | 6.2 | 4.9 | 5.1 | 5.2 | 3.8 |
|  | strength unnotched side (kg·cm/cm) | 33.8 | 35.7 | 31.6 | 38.0 | 33.3 | 32.2 | 32.6 | 27.5 |

TABLE 5

|  |  | Ex. | | | | | | |
|---|---|---|---|---|---|---|---|---|
|  |  | 11 | 12 | 13 | 14 | 15 | 16 | 17 |
| Compn. | (a) PPS (pt. by wt.) | (100) | " | " | " | " | " | " |
|  | (B) variety of graphite | B-1 | " | " | " | " | " | " |
|  | [av. particle diam. (μm)] | [200] |  |  |  |  |  |  |
|  | (pt. by wt.) | (10) |  |  |  |  |  |  |
|  | (C) variety of alkoxysilane | C-1 | " | " | " | " | " | " |
|  | (pt. by wt.) | (2) |  |  |  |  |  |  |
|  | (D) glass fiber (pt. by wt.) | (35) | " | " | " | " | " | " |
|  | calcium carbonate (pt. by wt.) | (35) | " | " | " | " | " | " |
|  | (E) variety of olefinic copolymer (pt. by wt.) | E-2 (10) | — | E-2 (5) | E-2 (20) | E-1 (10) | E-3 (10) | E-4 (10) |
| Properties | av. surface resistivity (Ω) | $3 \times 10^5$ | $2 \times 10^5$ | $4 \times 10^5$ | $6 \times 10^6$ | $8 \times 10^5$ | $2 \times 10^6$ | $7 \times 10^5$ |
|  | (variation) | (1~4) | (0.9~4) | (2~6) | (2~6) | (6~10) | (1~5) | (5~8) |
|  | tensile strength (kg/cm²) | 1103 | 1295 | 1201 | 1012 | 1153 | 1113 | 1096 |
|  | tensile elongation (%) | 1.8 | 1.4 | 1.6 | 2.3 | 1.5 | 1.7 | 1.7 |
|  | Izod notched side impact (kg·cm/cm) | 5.1 | 3.2 | 4.5 | 6.3 | 3.8 | 5.0 | 4.9 |
|  | strength unnotched side (kg·cm/cm) | 33.8 | 27.6 | 30.7 | 41.5 | 29.1 | 31.8 | 32.7 |

What we claim is:

1. A polyarylene sulfide resin composition having both excellent mechanical properties and improved conductivity and antistatic properties which consists of:

(A) 100 parts by weight of a polyarylene sulfide resin, (B) 3 to 50 parts by weight of a conductive material consisting essentially of expandable graphite having an average particle diameter of 5 to 800 μm, (C) 0.01 to 5 parts by weight of an alkoxysilane compound, (D) 0 to 300 parts by weight of a filler other than the component (B) which is selected from among fibrous, powdery and platy fillers, and (E) 0.5 to 30 parts by weight of one or more olefinic copolymers selected from among (a) copolymers of ethylene with an α-olefin having 3 or more carbon atoms, (b) olefinic copolymers of an α-olefin with an α,β-unsaturated acid or ester thereof and (c) a graft copolymer comprising the copolymers (a) or (b) and a polymer or copolymer comprising at least one of styrene, acrylonitrile, α,β-unsaturated carboxylic acids and esters thereof which are chemically bonded to the copolymers (a) or (b).

2. A polyarylene sulfide resin composition having improved conductivity and antistatic properties according to claim 1, wherein the alkoxysilane compound as the component (C) is at least one silane compound selected from the group consisting of epoxyalkoxysilanes, aminoalkoxysilanes, vinylalkoxysilanes and mercaptoalkoxysilanes.

3. The polyarylene sulfide resin composition of claim 1 wherein said polyarylene sulfide resin (A) comprises p-phenylene sulfide.

4. The polyarylene sulfide resin composition of claim 3 wherein said polyarylene sulfide resin (A) comprises a homopolymer of p-phenylene sulfide units.

5. The polyarylene sulfide resin composition of claim 4 wherein said homopolymer of p-phenylene sulfide units is a linear polymer.

6. The polyarylene sulfide resin composition as set forth in claim 3 wherein said polyarylene sulfide resin (A) comprises a copolymer containing at least 70 mol % of p-phenylene sulfide units.

7. The polyarylene sulfide resin composition of claim 6 wherein said copolymer comprises at least 80 mol % of p-phenylene sulfide units and at most 20 mol % of m-phenylene sulfide units.

8. The polyarylene sulfide resin composition of claim 1 wherein said alkoxysilane (C) is present in amounts of from about 0.1 to 3 parts by weight per 100 parts by weight of said polyarylene sulfide resin (A).

9. The polyarylene sulfide resin composition of claim 1 which contains said filler (D).

10. The polyarylene sulfide resin composition of claim 9 wherein said filler (D) comprises glass fiber.

11. The polyarylene sulfide resin composition of claim 9 wherein said filler (D) comprises a combination of a fibrous filler with a powdery or platy filler.

12. The polyarylene sulfide resin composition of claim 11 wherein said fibrous filler is glass.

13. The polyarylene sulfide resin composition of claim 1 wherein said olefin copolymer (E) comprises a copolymer of ethylene and glycidyl methacrylate.

14. The polyarylene sulfide resin composition of claim 1 wherein said olefin copolymer (E) comprises a copolymer of ethylene and glycidyl methacrylate grafted with a styrene/acrylonitrile copolymer.

15. The polyarylene sulfide resin composition of claim 1 wherein said olefin copolymer (E) comprises a copolymer of ethylene and glycidyl methacrylate grafted with polymethylmethacrylate.

16. The polyarylene sulfide resin composition of claim 1 wherein said olefin copolymer (E) comprises a copolymer of ethylene and ethylacrylate grafted with maleic anhydride.

17. The polyarylene sulfide resin composition of claim 1 wherein said alkoxysilane (C) comprises aminopropyltriethoxysilane.

18. The polyarylene sulfide resin composition of claim 1 wherein said alkoxysilane (C) comprises glycidoxypropyltrimethoxysilane.

19. The polyarylene sulfide resin composition of claim 1 wherein said alkoxysilane (C) comprises mercaptopropyltrimethoxysilane.

* * * * *